UNITED STATES PATENT OFFICE.

JULIUS J. KOCH, OF ST. LOUIS, MISSOURI.

IMPROVEMENT IN LUBRICATING COMPOUNDS.

Specification forming part of Letters Patent No. 161,521, dated March 30, 1875; application filed November 16, 1874.

*To all whom it may concern:*

Be it known that I, JULIUS KOCH, of St. Louis, St. Louis county, State of Missouri, have invented a certain new and useful Lubricating Compound, of which the following is a specification:

This composition consists of lime dry-slaked, and sifted through a very fine mesh, and mixed in the proper proportions with paraffine oil and rosin-oil, as hereinafter described.

The lime is dry-slaked with water so as to give a dry and fine powder, and this is sifted through a fine sieve or bolt, so as to detain all coarse particles and grit. The paraffine-oil is of 25° gravity, and winter-pressed. The rosin-oil is the first run refined.

In compounding the lubricant I take more or less of the oils, in comparison with the lime, according to the temperature of the air and metal with which it is surrounded and comes in contact when in use. The colder the temperature the more oil is used, with the same quantity of lime.

For ordinary use the lubricant has of finely-pulverized lime, eight pounds; paraffine-oil, eight gallons; and refined rosin-oil, three gallons.

In compounding it I first mix the whole of the lime and paraffine-oil, and stir thoroughly until free from lumps; then add the refined rosin-oil and continue to stir. At first, after the addition of the rosin-oil, the mixture will thicken, but as the stirring continues it will become thinner, and assume a very fine, smooth consistence, with a glossy surface. The process is then complete.

The compound is used for car-axles, and for machinery in general.

I claim as my invention—

The lubricating compound, substantially as herein described.

JULIUS J. KOCH.

Witnesses:
SAML. KNIGHT,
ROBERT BURNS.